United States Patent
Morimoto et al.

(10) Patent No.: US 10,267,626 B2
(45) Date of Patent: Apr. 23, 2019

(54) MEASUREMENT METHOD, MEASUREMENT APPARATUS, MEASUREMENT PROGRAM AND COMPUTER READABLE RECORDING MEDIUM IN WHICH MEASUREMENT PROGRAM HAS BEEN RECORDED

(71) Applicant: 4D SENSOR INC., Wakayama (JP)

(72) Inventors: Yoshiharu Morimoto, Wakayama (JP); Akihiro Masaya, Wakayama (JP); Akifumi Takagi, Wakayama (JP)

(73) Assignee: 4D SENSOR INC., Wakayama (JP)

( * ) Notice: Subject to any disclaimer, the term of this patent is extended or adjusted under 35 U.S.C. 154(b) by 0 days.

(21) Appl. No.: 14/906,987

(22) PCT Filed: Jun. 30, 2014

(86) PCT No.: PCT/JP2014/067419
§ 371 (c)(1),
(2) Date: Jan. 22, 2016

(87) PCT Pub. No.: WO2016/001985
PCT Pub. Date: Jan. 7, 2016

(65) Prior Publication Data
US 2018/0128602 A1    May 10, 2018

(51) Int. Cl.
*G01B 11/25* (2006.01)
*G06T 7/521* (2017.01)

(52) U.S. Cl.
CPC ........ *G01B 11/2513* (2013.01); *G01B 11/25* (2013.01); *G01B 11/254* (2013.01); *G06T 7/521* (2017.01)

(58) Field of Classification Search
CPC ...................................................... G06T 7/521
See application file for complete search history.

(56) References Cited

U.S. PATENT DOCUMENTS

| 5,668,631 A | 9/1997 | Norita |
| 6,940,608 B2 | 9/2005 | Sakita |
| 2002/0135751 A1 | 9/2002 | Steinbichler et al. |
| 2004/0246496 A1 | 12/2004 | Yoshida |
| 2008/0075328 A1 | 3/2008 | Sciammarella |

(Continued)

FOREIGN PATENT DOCUMENTS

| JP | 7-260451 | 10/1995 |
| JP | 2002-303512 | 10/2002 |

(Continued)

OTHER PUBLICATIONS

Extended European Search Report dated Feb. 3, 2017 in corresponding European Patent Application No. 14896657.5.

(Continued)

*Primary Examiner* — Qian Yang
(74) *Attorney, Agent, or Firm* — Staas & Halsey LLP

(57) ABSTRACT

A phase of a specific frequency component of an image of a grid image on the surface of an object taken by a camera is found, and the location of the surface of the object is found from the phase. As a result, measurement that is strong against noise can be carried out without projecting a grid having a brightness distribution of precise cosine waves. In addition, the process is simple and can be used for the surface of a moving object. The number of pixels used for the measurement is smaller than that in the sampling moire method.

8 Claims, 6 Drawing Sheets

(56) References Cited

U.S. PATENT DOCUMENTS

| | | |
|---|---|---|
| 2010/0302364 A1 | 12/2010 | Kim |
| 2015/0049331 A1 | 2/2015 | Ri |
| 2016/0161249 A1 | 6/2016 | Ri |
| 2017/0248413 A1 | 8/2017 | Ohyama |

FOREIGN PATENT DOCUMENTS

| | | |
|---|---|---|
| JP | 2006-64590 | 3/2006 |
| JP | 2006-330771 | 12/2006 |
| JP | 2008-46037 | 2/2008 |
| JP | 2008-281491 | 11/2008 |
| JP | 2009-264852 | 11/2009 |
| JP | 2011-174874 | 9/2011 |

OTHER PUBLICATIONS

Ruowei Gu et al., "Talbot projected 3-D profilometry by means of one step phase-shift algorithms", International Symposium on Optical Fabrication, Testing, and Surface Evaluation, vol. 1720, SPIE, Oct. 20, 1992, pp. 470-477.

Malgorzata Kujawinska et al., "Spatial-carrier phase shifting technique of fringe pattern analysis", Industrial Applications of Holographic and Speckle Measuring Techniques, vol. 1508, SPIE, Oct. 1, 1991, pp. 61-67.

Katherine Creath et al., "N-point Spatial Phase-measurement Techniques for Non-destructive Testing", Optics and Lasers in Engineering, vol. 24, No. 5-6, Elsevier Science Limited., May 1996, pp. 365-379.

Yves Surrel, "Fringe Analysis", Photomechanics, Topics in Applied Physics, vol. 77, Springer Berlin Heidelberg, Feb. 9, 2000, pp. 55-102.

International Search Report dated Sep. 2, 2014, in corresponding International Application No. PCT/JP2014/067419.

Yasuhiko Arai et al., "High Speed- and High Resolutive-Moiré Topography by the Method of Fringe Scanning Interferometry", Kogaku, vol. 15, No. 5, pp. 402-406, 1986.

Yoshiharu Morimoto et al., "Recent Studies on Shape and Deformation Measurements by Moiré Method and Grid Method", Journal of JSNDI, vol. 52, No. 3, 2003, pp. 116-121.

Ri, S. et al., "Non-Contact Measurement of the Displacement Distribution of a Structure in Accordance with a Sampling Moiré Method," Inspection Technologies, Japan Industrial Publishing Co., Ltd., vol. 14, No. 5, 2009, pp. 1-6.

Mitsuo Takeda et al., "Fourier Transform Profilometry for the Automatic Measurement of 3-D Object Shapes," Applied Optics, vol. 22, No. 24, Dec. 15, 1983, pp. 3977-3982.

Y. Morimoto et al., "Two-Dimensional Moiré Method and Grid Method Using Fourier Transform," Experimental Mechanics, vol. 29, No. 4, pp. 399-404, Dec. 1989.

Motoharu Fujigaki et al, "Shape Measurement with Grating Projection Using Whole-Space Tabulation Method", vol. 8, No. 4, pp. 92-98, Dec. 2008.

Yves Surrel et al., "Simultaneous u-v displacement field measurement with a phase-shifting grid method", Interferometry '94: Photomechanics, vol. 2342, SPIE, Nov. 30, 1994, pp. 66-75.

Maria Pirga et al., "Two directional spatial-carrier phase-shifting method for analysis of crossed and closed fringe patterns", Optical Engineering, vol. 34, No. 8, SPIE, Aug. 1, 1995, pp. 2459-2466, retrieved from URL: http://opticalengineering.spiedigitallibrary.org/article.aspx?articleid=1073851 on Jan. 24, 2017.

International Search Report dated Sep. 2, 2014, in corresponding International Application No. PCT/JP2014/067420.

U.S. Office Action dated May 5, 2017 from U.S. Appl. No. 14/907,009.

U.S. Notice of Allowance dated Oct. 31, 2017 from U.S. Appl. No. 14/907,009.

U.S. Corrected Notice of Allowability dated Nov. 15, 2017 from U.S. Appl. No. 14/907,009.

U.S. Office Action dated Apr. 23, 2018 from U.S. Appl. No. 15/100,460.

U.S. Appl. No. 14/907,009 (U.S. Pat. No. 9,891,042), filed Jan. 22, 2016 (Feb. 13, 2018), Yoshiharu Morimoto et al., 4D Sensor Inc.

U.S. Appl. No. 15/100,460, filed May 31, 2016, Yoshiharu Morimoto et al., 4D Sensor Inc.

Japanese Office Action dated Nov. 13, 2018 from Japanese Patent Application No. 2015-535637, 5 pages.

U.S. Office Action dated Feb. 12, 2019 from U.S. Appl. No. 15/100,460.

MEASUREMENT METHOD, MEASUREMENT APPARATUS, MEASUREMENT PROGRAM AND COMPUTER READABLE RECORDING MEDIUM IN WHICH MEASUREMENT PROGRAM HAS BEEN RECORDED

CROSS-REFERENCE TO RELATED APPLICATIONS

This application is a U.S. National Stage Application which claims the benefit under 35 U.S.C. 371 of PCT International Application PCT/JP2014/067419, filed Jun. 30, 2014, the contents of which are incorporated herein by reference.

TECHNICAL FIELD

The present invention relates to a three-dimensional form measuring apparatus for carrying out the measurement of the three-dimensional form on the surface of an object to be measured having a three-dimensional surface form such as large-scale structures, industrial products, sheet-like structures, human bodies, animals and plants as well as natural formations in a non-contact manner, at a high speed and with high precision. The invention can also be used for the measurement of the location of a vibration plane or the non-contact measurement of a displacement distribution.

BACKGROUND ART

A grid projection method has been publicly known, according to which a grid pattern is projected on an object to be measured, and a phase of each pixel of the grid pattern image that has been gained by imaging the grid pattern projected on the object to be measured is found, and thereby, the measurement of a three-dimensional form is carried out.

FIG. 6 shows an example of an optical system for an apparatus for measuring a form in accordance with a one-dimensional grid projection method.

The height of the center of the camera lens and the height of the light source of the projector are the same relative to the reference plane, and the camera imaging surface and the grid plane are in the optical system for a moire topography, which is parallel to the reference plane. In the moire topography, white lines can be imaged as contour lines in the W positions in FIG. 6, and black lines can be imaged as contour lines in the B positions.

In accordance with the grid projection method, phases of a grid can be analyzed so that the deformation of the grid can be analyzed with high precision, and thus, out-of-plane deformation and a three-dimensional form can be measured with high precision. A phase shift method and a Fourier transform method have been used as conventional phase analysis methods.

PRIOR ART DOCUMENTS

Non-Patent Document 1: Yasuhiko Arai and Tadao Kurata, High Speed- and High Resolutive-Moire Topography by the Method of fringe Scanning Interferometry, Kogaku (in Japanese), Vol. 15, No. 5, pp. 402-406 (1986)
Non-Patent Document 2: Yoshiharu Morimoto, Motoharu Fujigaki and Satoru Yoneyama, Recent Studies on Shape and Deformation Measurements by Moire Method and Grid Method, Journal of JSNDI (in Japanese), 52-3 (2003), pp. 116-121
Non-Patent Document 3: Ri, S., Morimoto, Y. and Fujigaki, M., "Non-Contact Measurement of the Displacement Distribution of a Structure in Accordance with a Sampling Moire Method," Inspection Technology, Japan Industrial Publishing Co., Ltd., 14 (5), (2009), pp. 1-6
Non-Patent Document 4: Takeda, M. and Mutoh, K., "Fourier Transform Profilometry for the Automatic Measurement of 3-D Object Shapes," Applied Optics, 22-24, pp. 3977-3982 (1983)
Non-Patent Document 5: Morimoto, Y., Seguchi, Y. and Higashi, T., "Two-Dimensional Moire Method and Grid Method Using Fourier Transform," Experimental Mechanics, Vol. 29, No. 4, pp. 399-404 (1989)
Non-Patent Document 6: Motoharu Fujigaki and Yoshiharu Morimoto, Shape Measurement with Projection Using Whole-space Tabulation Method, Vol. 8, No. 4, pp. 92-98 (2008)

SUMMARY OF THE INVENTION

1. Problem to be Solved by the Invention

In accordance with a grid projection method or a moire method, phases of a grid are analyzed so that the deformation of an object can be analyzed with high precision, which makes the measurement of in-plane deformation or a three-dimensional form possible with high precision (Non-Patent Documents 1 and 2). A phase shift method and a Fourier transform method have been used as conventional phase analysis methods. From among these, a sampling moire method (Non-Patent Document 3) and a Fourier transform method (Non-Patent Documents 4 and 5) allow for the analysis of phases with one image, and therefore are useful for the analysis of a moving object and the like.

A high-speed calculation is necessary in order to measure a moving object in real time, and therefore, it is better to carry out phase calculation with as little image data as possible. However, in accordance with the sampling moire method, phase calculation is carried out using data during two periods, whereas in accordance with the Fourier transform method, phase analysis is carried out using data for all the pixels, and thus, measurement cannot be carried out for a moving image with little image data.

2. Means for Solving Problem

The present invention provides a new grid projection method for analyzing phases in image data for one period of a grid using Fourier transformation. This allows for high-speed analysis of a phase distribution with one image, which also makes analysis of a moving image possible.

3. Effects of the Invention

The present invention is characterized as follows.
(1) Precision is high because of the measurement using phase analysis.
(2) Phase analysis can be carried out with one image, and therefore, form measurement of a moving object is possible.
(3) Only frequency 1 is sampled in accordance with Fourier transformation, and therefore, it is not necessary to project a grid having a brightness distribution of precise cosine waves.
(4) In addition, only frequency 1 is sampled in accordance with Fourier transformation, and therefore, the noise that appears in high-frequency portions is automatically deleted, and thus, the system is strong against noise.

(5) The process is simple and can be carried out at a high speed.
(6) The gauge length is N pixels, which is shorter than that in the sampling moire method. In general, the gauge length is shorter than that in the digital image correlation method.
(7) In accordance with the sampling moire method, moire fringes are generated from linear interpolation, while in accordance with the present invention, correlation is taken with cosine waves, which makes precision higher.

PREFERRED EMBODIMENTS OF THE INVENTION

Figure 1:
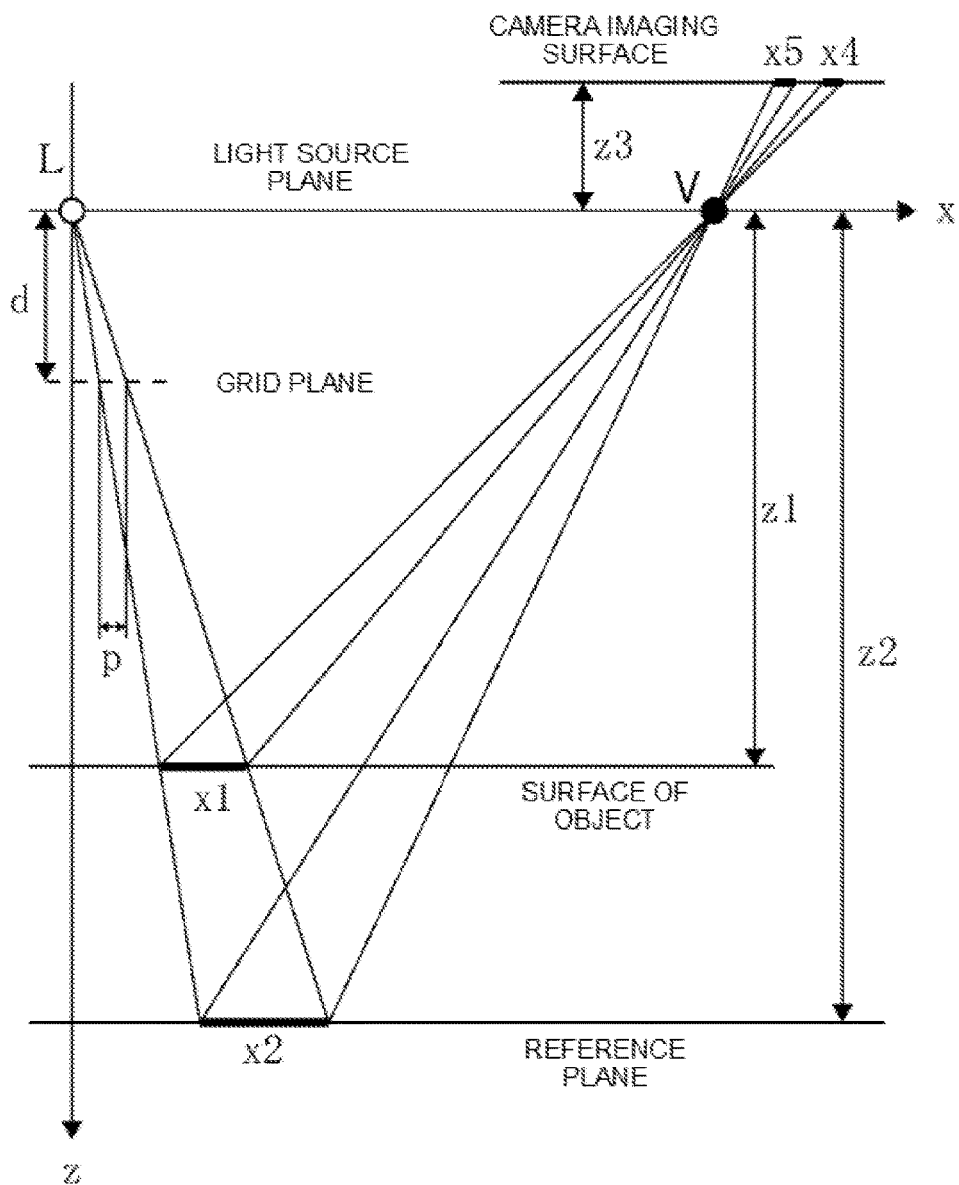
FIG. 1 is a diagram illustrating an optical system of moire topography.

The present invention relates to a measurement method for the analysis of a grid on the surface of an object by taking an image thereof with a camera. Not only the form on the surface of an object can be measured by measuring the height of the surface of the object, but also the displacement of the surface of the object in a lateral direction can be measured by taking an image of a grid pattern provided on the surface of the object with a camera.
First, the measurement principle is described below.
<Optical System and Coordinate>
FIGS. 1 through 2B are schematic diagrams illustrating the grid projection mechanism of a form measuring apparatus and an object to be measured.
First, FIG. 1 illustrates the detail of the optical system for moire topography.
L denotes the location of a light source, and V denotes the center of the camera lens. A grid is located at a distance d away from the location L of the light source, where the width of one period is p.
In this optical system, the height of the center V of the camera lens and the height of the light source L of the projector are the same relative to the reference plane, where the camera imaging surface and the grid plane are parallel to the reference surface.
The surface of the object is in a location at a distance z1 away from the light source L, the reference plane is in a location at a distance z2 away from the light source L, and the grid plane is in a location at a distance d away from the light source L. The grid plane is parallel to the reference plane, and one-dimensional grid lines at equal intervals of which the period is p are drawn in the grid plane. A point light source is used as the light source; however, a one-line light source that is parallel to the grid lines may be used.

The plane that includes the light source L and is parallel to the reference plane is referred to as light source plane. For the purpose of explanation, the light source is regarded as the origin of the x, y and z coordinates, where the direction perpendicular to the reference plane is the z direction. In FIG. 1, the downward direction is positive in the z direction.
The direction perpendicular to the grid lines drawn in the grid plane is the x direction, and the direction that is parallel to the grid lines is the y direction. The center of the camera lens is within the light source plane and at a distance v away from the light source L in the x direction. The camera imaging surface is parallel to the reference plane and the grid plane, where the i direction and the j direction in the pixel coordinates (i, j) on the camera imaging surface correspond to the x direction and the y direction, respectively.
In this optical system, images within one period of the grid on the camera imaging surface have the same width at whichever height the surface of the object or the reference plane is located. Accordingly, an image within one period of the grid is reflected onto N pixels at whichever height the surface of the object or the reference plane is located when it is set that one period of the grid is reflected onto N pixels on the digital camera imaging surface. This is described as follows in reference to FIG. 1.
The shadow of one period of the projected grid is x1 on the surface of the object and x2 in the reference plane. The distance from the light source plane is z1 on the surface of the object, z2 in the reference plane, z3 on the camera imaging surface, and d in the grid plane.
The shadow of the one period p of the grid is x1, which is z1/d times greater than p on the surface of the object, and x2, which is z2/d times greater than p in the reference plane. The size x4 on the camera imaging surface is z3/z1 times greater than x1, while x5 is z3/z2 times greater than x2, and therefore, x4 and x5 are both z3/d times greater than p. Namely, the size of one period of the grid reflected on the camera imaging surface is determined by the ratio of the distance between the light source plane and the grid to the distance between the center of the camera lens and the camera imaging surface, and is not affected by the distance vis-à-vis the surface of the object or the reference plane.
As a result, the number of grid lines reflected on the camera imaging surface and the number of pixels on the camera imaging surface are always proportional, and the number of sensor pixels in the camera that capture the image within one period of the grid is constant irrelevant of the height of the object to be measured. That is to say, an image during one period of the grid is always reflected onto sequential N pixels when one period of the grid is set to be reflected onto N pixels.
Meanwhile, as can be seen from FIG. 1 where the locations of x4 and x5 are away from each other, when the distance vis-à-vis the surface of the object or the reference plane changes, the location in which the grid is reflected on the camera imaging surface changes. In other words, the phase of the grid that is reflected onto the pixels on the camera imaging surface changes depending on the height of the surface of the object relative to the reference plane.
Thus, the height can be found through phase analysis. That is to say, the N pixels are Fourier transformed so as to sample the frequency 1 having the maximum power spectrum, and the phase of the frequency 1 can be found in order to measure the height of the surface of the object. In addition, the above-described frequency may be set in advance in accordance with the optical system for the actual measurement, and the phase of the thus-preset frequency can be found so that the height of the surface of the object can be measured.

Here, it is preferable to adjust the magnifying power of the lens so that one period of the grid projected onto the reference plane corresponds to N pixels of the digital camera as described above.

Figure 2A:
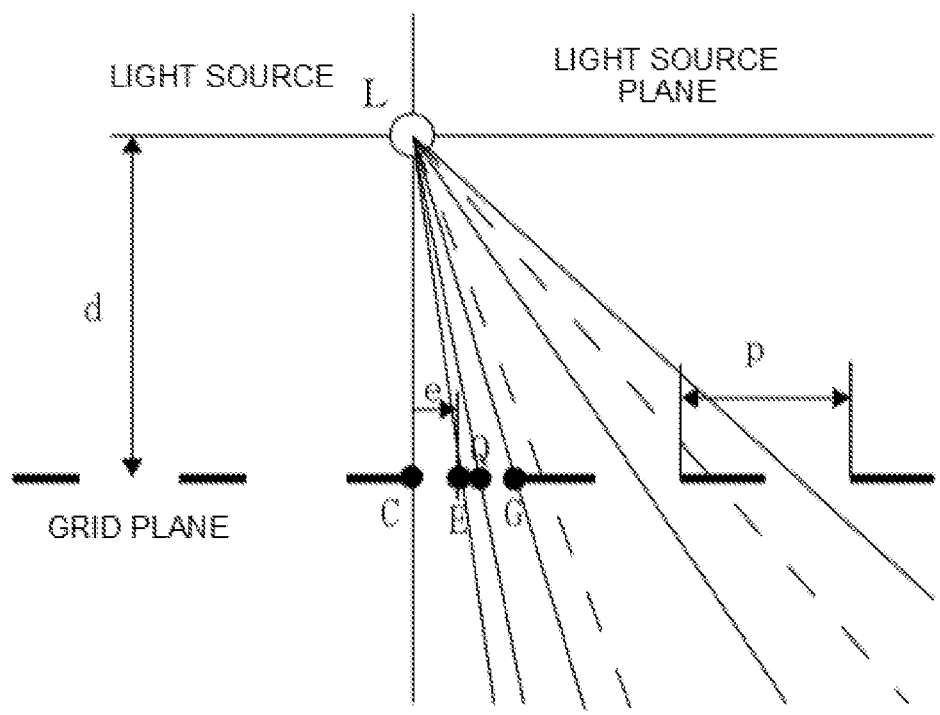
FIG. 2A is a diagram illustrating the relationship between a phase of an object as viewed by one pixel on the camera imaging surface and a phase in the reference plane.
Figure 2B:
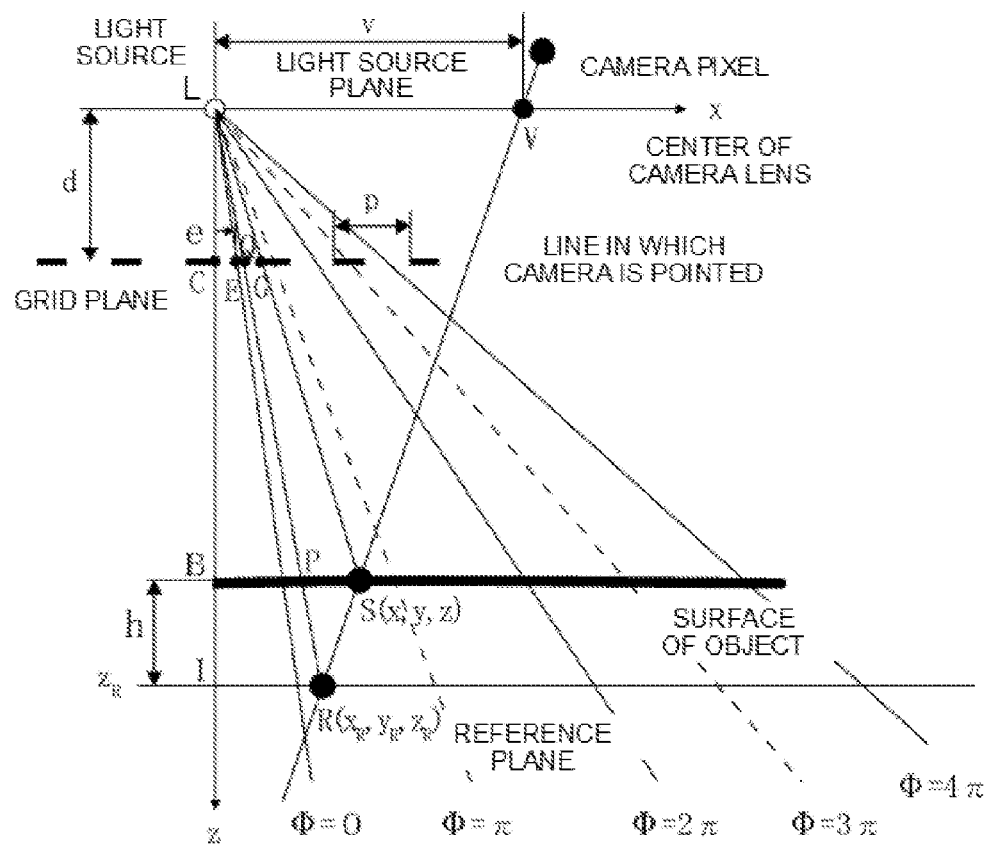
FIG. 2B is a diagram illustrating the relationship between a phase of an object as viewed by one pixel on the camera imaging surface and a phase in the reference plane.

Next, a method for finding the height of the surface of the object relative to the reference plane is described in reference to FIGS. 2A and 2B.

FIG. 2A is an enlargement of an upper portion of FIG. 2B.

First, the center V of the camera lens is placed at a location with coordinates (v, 0, 0) along the x axis. That is to say, the center V of the camera lens is at a distance v away from the light source L. The point S on the surface of the object is reflected onto a pixel on the camera imaging surface onto which the point R in the reference plane is reflected when the object is placed. In FIGS. 2A and 2B, the line that passes through this pixel, the point S and the point R is denoted as the direction in which the camera is pointed. The point along the z axis onto which the point S on the surface of the object is projected perpendicularly is the point B, and the point along the z axis onto which the point R in the reference plane is projected perpendicularly is the point I. In addition, the point in the grid plane through which the light beam passes from the location L of the light source to the point R is the point Q, and the point at which the light beam from the location L of the light source to the point R crosses the line, which is drawn between the point S on the surface of the object and a point along the z axis so as to be perpendicular to the z axis, is the point P. Furthermore, the point in the grid plane through which the light beam passes from the location L of the light source to the point S is the point G. The point at which the z axis and the grid plane cross is the point C. The point E is the origin of the grid, and the distance between the point C and the point E is e. In addition, the distance between the point I and the point B, that is to say, the height of the surface of the object relative to the reference plane, is h.

<Projected Grid Phases>

Now, the transmittance distribution $I_g$ of the grid located at z=d is in cosine wave form and can be represented by the following formula.

$$I_g = a_g \cos\{\Phi\} + b_g = a_g \cos\left\{\frac{2\pi}{p}(x_g - e)\right\} + b_g \quad \text{[Formula 1]}$$

Here, $a_g$ is the amplitude, $\Phi$ is the phase of the grid, and $b_g$ is the background. The light source illuminates the grid so that the shadow of the grid is projected onto the reference plane or the surface of the object. The brightness distribution when the shadow of the grid is reflected onto the camera imaging surface can be represented by the following formula at the height z of the reference plane or the surface of the object relative to the sequential N pixels that correspond to one period of the grid.

$$I_n = a_g \frac{d^2}{z^2}\cos\left\{\frac{2\pi}{p}\left(\frac{d}{z}x + \frac{np}{N} - e\right)\right\} + b_g \frac{d^2}{z^2} \quad \text{[Formula 2]}$$

Here, $n = 0, 1, \ldots N$.

$$a = a_g \frac{d^2}{z^2} \quad \text{[Formula 3]}$$

$$b = b_g \frac{d^2}{z^2}$$

$$\Theta_n = \frac{2\pi}{p}\left(\frac{d}{z}x + \frac{np}{N} - e\right) \quad \text{[Formula 5]}$$

When Formulas 3, 4 and 5 are substituted into Formula 2, Formula 6 is gained.

$$I_n = a \cos \Theta_n + b \quad \text{[Formula 6]}$$

The camera lens is adjusted so that one period of the shadow of the grid starting from the point S (x, y, z) on the surface of the object in the x direction is reflected onto the sequential N pixels on the camera imaging surface.

Then, a discrete Fourier transformation is carried out on these N pieces of data so as to sample the frequency 1 from which the phase is found. Thus, the phase θ of smooth cosine waves can be gained for phase analysis with very high precision.

The phase θ ($-\pi < \theta \leq \pi$) can be calculated using the following formula.

$$\frac{\sum_{k=0}^{N-1} I_k \sin\left(k\frac{2\pi}{N}\right)}{\sum_{k=0}^{N-1} I_k \cos\left(k\frac{2\pi}{N}\right)} = -\tan\theta \quad \text{[Formula 7]}$$

When the phase θ is found for all the pixels in the x direction in the same manner as described above so that the phases are connected in the x direction, the phase Θ of the grid can be gained.

<Phases of Moire Fringes Representing Contour Lines>

In moire topography, the phase $\Theta_M$ of a moire fringe representing a contour line is found as the difference $\Theta_M = \Theta - \Theta_R$ between the phase $\Theta_R$ of the grid projected onto the reference plane and the phase Θ of the grid projected onto the object. As a result, z can be found or the height h relative to the reference plane $h = z_R - z$ can be found.

The phase $\Theta_R$ of the shadow of the grid projected onto the point R in the reference plane is Formula 8.

$$\Theta_R = \frac{2\pi}{p}\left\{\frac{d}{z_R}x_R - e\right\} \quad \text{[Formula 8]}$$

Here, Formula 9 is gained from the similarity between ΔLIR and ΔLCQ.

$$x_R = \frac{z_R}{d}x_Q \quad \text{[Formula 9]}$$

When Formula 9 is substituted into Formula 8, Formula 10 is gained.

$$\Theta_R = \frac{2\pi}{p}\{x_Q - e\} \quad \text{[Formula 10]}$$

The similarity between ΔLBS and ΔLCG is used in the same manner so as to gain the phase $\Theta_S$ of the shadow of the grid projected onto the point S on the object.

$$\Theta_S = \frac{2\pi}{p}\left\{\frac{d}{z_S}x_S - e\right\} \quad \text{[Formula 11]}$$
$$= \frac{2\pi}{p}\left\{\frac{d}{z_S}\frac{z_S}{d}x_G - e\right\}$$
$$= \frac{2\pi}{p}\{x_G - e\}$$

The phase $\Theta_M$ of a moire fringe can be gained in the following formula as the difference between the phase of the point R in Formula 10 and the phase of the point S in Formula 11.

$$\Theta_M = \Theta_S - \Theta_R = \frac{2\pi}{p}(x_G - x_Q) \quad \text{[Formula 12]}$$

Meanwhile, Formula 13 is gained from the similarity between the two triangles ΔLPS and ΔLQG.

$$x_G - x_Q = (x_S - x_P)\frac{d}{z_S}$$

In addition, Formula 14 is gained from the similarity between ΔRLV and ΔRPS.

$$x_S - x_P = v\frac{z_R - z_S}{z_R} \quad \text{[Formula 14]}$$

Formula 14 leads to Formula 15.

$$\Theta_M = \frac{2\pi}{p}(x_G - x_Q) = \frac{2\pi}{p}(x_S - x_P)\frac{d}{z_S} = \frac{2\pi}{p}v\frac{z_R - z_S}{z_R}\frac{d}{z_S} \quad \text{[Formula 15]}$$

As a result, Formula 16 is gained, followed by Formula 17.

$$z_S = \frac{2\pi v d z_R}{p z_R \Theta_M + 2\pi v d} \quad \text{[Formula 16]}$$

$$h = z_R - z_S = z_R - \frac{2\pi v d z_R}{p z_R \Theta_M + 2\pi v d} = \frac{p \Theta_M z_R^2}{p z_R \Theta_M + 2\pi v d} \quad \text{[Formula 17]}$$

As described above, the phase of a moire fringe can be measured as the difference in the phase between the grid in the reference plane and the grid on the surface of the object, and thus, the height h of the surface of the object relative to the reference plane can be found.

Next, examples are described.

Example 1

First, a method for measuring the form of the surface of an object by finding the height of the surface of the object is described.

Figure 3:
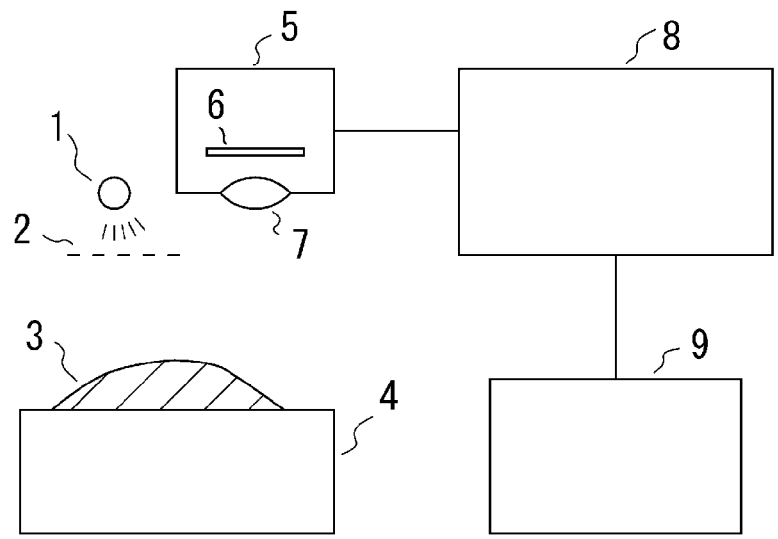
FIG. 3 shows the configuration of the entirety of the apparatus according to Example 1.

FIG. 3 shows the configuration of the entirety of the measurement apparatus according to Example 1.

1 is a lamp such as an LED which corresponds to the light source. placed, 5 is a digital camera, 6 is an image sensor, 7 is a lens, 8 is a computer, and 9 is an output unit. The measurement results may be stored in the computer 8 or the like, and therefore, the results can be gained without the use of the output unit 9. In addition, a projector such as a commercially available liquid crystal projector may be used as the lamp 1 and the grid 2. In this case, the grid 2 is formed by allowing the liquid crystal display element to display a grid. When a projector is used, the width and the orientation of the grid can be freely changed.

When the object 3 is illuminated with the lamp 1, the shadow of the grid 2 is projected on the surface of the object, and an image of the shadow is reflected onto the image sensor 6 in the digital camera 5 via the lens 7. The reflected image is sent to the computer 8 from the digital camera 5. Then, the image is analyzed by means of the program that is stored in the computer 8 for implementing the method according to the present invention, and thus, the measurement value is gained. The thus-gained measurement value is stored in the computer 8, and at the same time processed into an output image, which is sent to the output unit 9 so as to be outputted if necessary. The output unit is typically a display or a printer.

The reference plane may be on the surface of the base 4, and an object having the reference plane may be placed on the base 4. Measurement can be carried out for the reference plane and the surface of an object, and therefore, an object that has the reference plane as the surface may be placed. In addition, the entire system containing the lamp 1, the grid 2, the object 3, the base 4 and the digital camera 5 may be in a horizontal state so that the form of the surface of the object can be measured in the lateral direction, or measurement in a diagonal direction is also possible.

<Phase Analysis Procedure>

Figure 4:
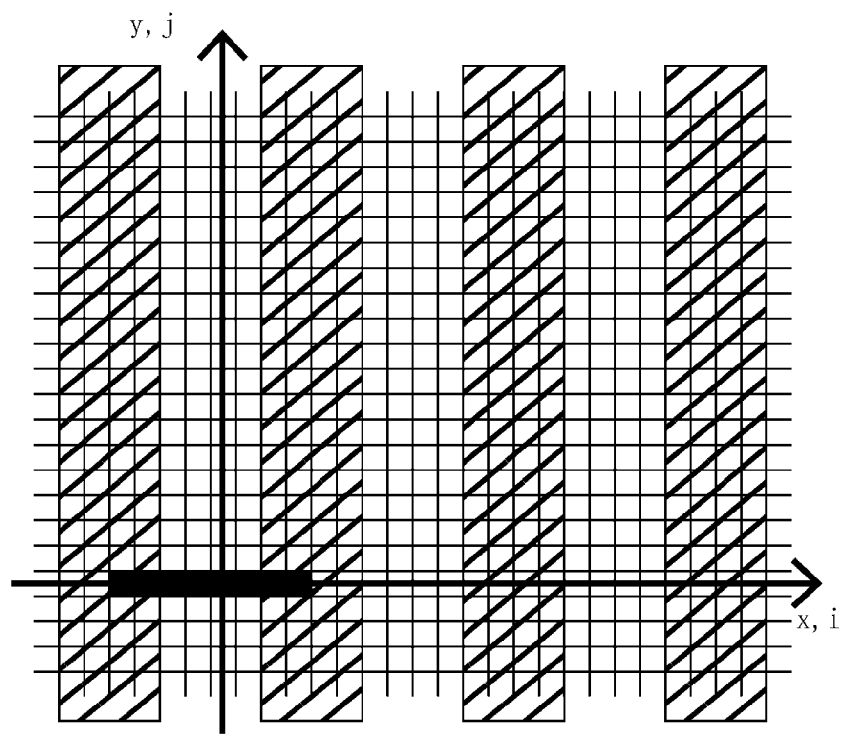
FIG. 4 shows an image of a grid reflected on the camera imaging surface.

A one-dimensional grid is projected onto the reference plane. This image is taken by a digital camera. FIG. 4 is a diagram illustrating an enlargement of a portion of the thus-taken image. In the case of this example, the magnifying power is adjusted in such a manner that one period of the grid corresponds to N pixels on the camera imaging surface (here, N=8). A pixel on the camera imaging surface is shown as a black rectangle. The hatched portions in this figure indicate the portions with low brightness in the grid, while the remaining portions indicate the portions with high brightness in the grid. The direction that is perpendicular to the grid lines is the x direction, and the direction that is perpendicular to the x direction is the y direction. The coordinates of a pixel on the camera imaging surface are (i, j). Thus, an image is taken with the i direction and the j direction matching the x direction and the y direction, respectively.

This image is processed as follows.

Figure 5A:
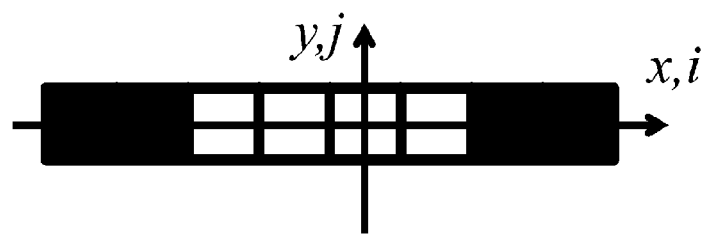
FIG. 5A shows a procedure for processing the grid.

(1) A one-dimensional Fourier transformation is carried out on the image data of the sequential N pixels (FIG. 5A).

Figure 5B:
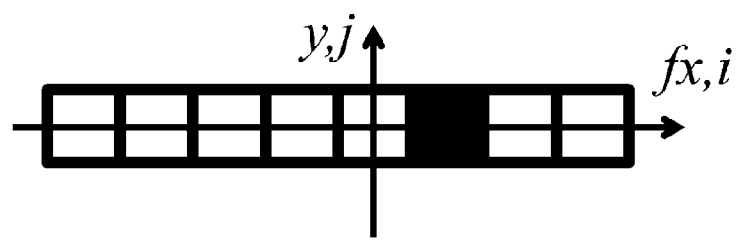
FIG. 5B shows a procedure for processing the grid.

(2) As a result, the frequency spectrum from $-N/2$ to $N/2$ is gained (FIG. 5B). From this, a component of the frequency 1 or the frequency $-1$ with one period of N pixels having the maximum power spectrum is sampled. In FIG. 5B, only the frequency 1 is taken out.

Figure 5C:
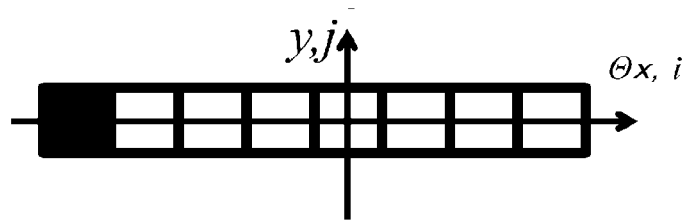
FIG. 5C shows a procedure for processing the grid.
Figure 6:
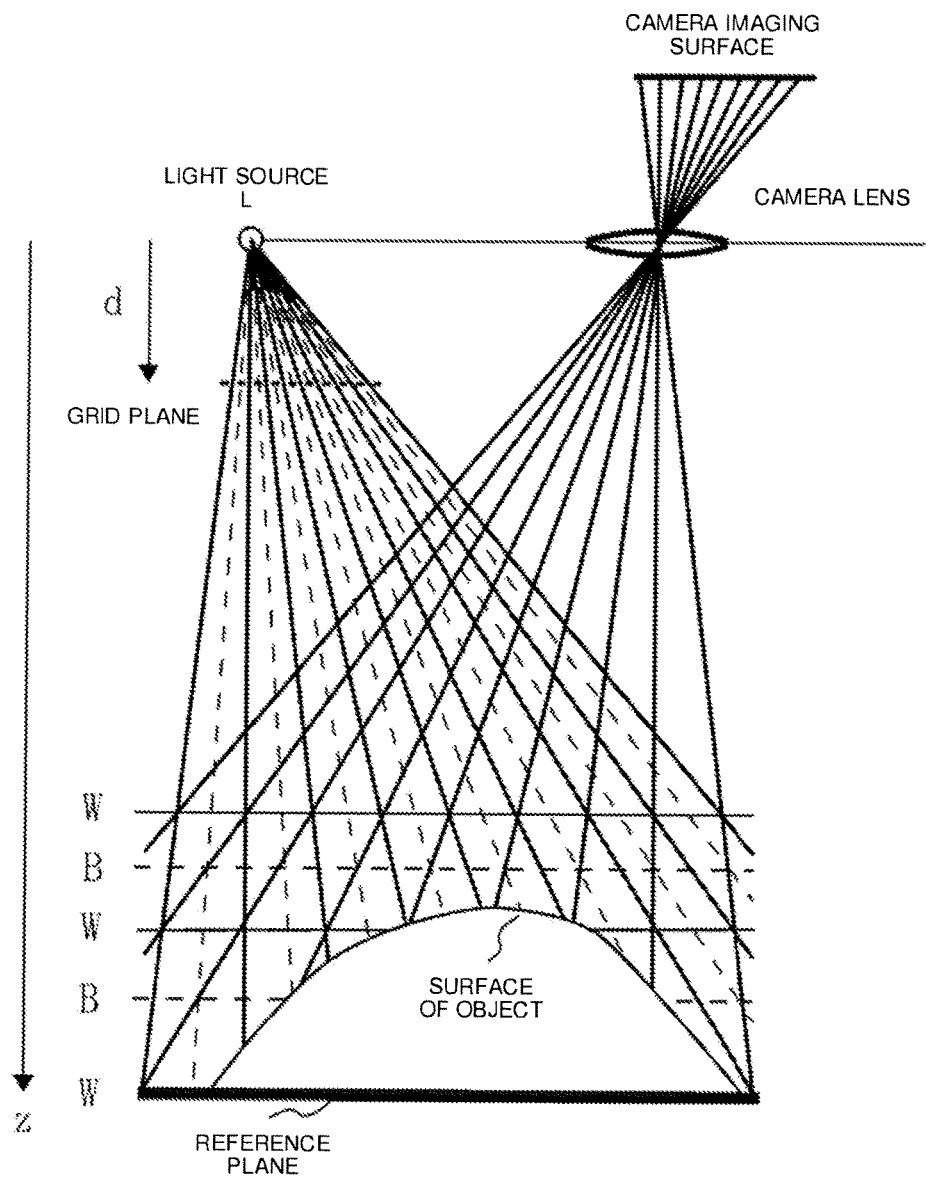
FIG. 6 shows an optical system (moire topography) for a grid projection method.

(3) When phase calculation is carried out on the thus-sampled frequency, a phase is gained and then stored so as to correspond to the pixel that is at the head of the grid of N pixels (FIG. 5C).

(4) Next, the combination of the N pixels for the grid is shifted in the x direction by one pixel, and the phase calculation and storage from (1) to (3) are repeated.

(5) After all the shifting in the x direction is finished, the scanning (1) through (4) is carried out for all in the y direction.

In the case where the phase is directly found using formula 7, the procedure (1) through (3) is collectively carried out. The thus-gained phases of nearly one image provide a phase distribution of this grid in the reference plane.

In the case where the phases of the grid on an object are analyzed, the camera is left as it is, and an object is placed instead of the reference plane when the calculation similar to the above (1) through (5) is repeated. The thus-gained phase distribution is the phase distribution on the surface of an object.

Next, the connection of phases is carried out for the thus-gained phases on the surface of the object and the phases in the reference plane, respectively. In the case of the grid projection method, the phases of the grid basically provide a monotone function. Therefore, the connection of phases can be easily carried out by increasing or decreasing $2\pi$ when a phase jumps.

After the connection of phases, the phase $\theta_M$ of a moire fringe, which is the difference between the phase of the object and the phase of the grid in the reference plane, is found for each pixel. The height h can be found from this using Formula 17.

Here, the phase of the frequency 1 is gained after Fourier transformation, and therefore, measurement that is strong against noise can be carried out without projecting a grid having a brightness distribution of precise cosine waves.

Example 2

Though the height and the form of the surface of an object are measured in Example 1, displacement of the surface of an object in the horizontal direction can be measured by taking an image of the grid on the surface of the object when the grid is drawn on the surface of the object instead of using a grid for projection, a film where a grid is drawn is pasted or an existing grid on the surface of the object is used.

Typically, an image of the grid on the surface of the object is taken by a camera before and after the displacement in the same manner as in Example 1. A Fourier transformation is carried out on the image, and then the connection of phases is carried out on the phases of frequency 1 so that phases are stored so as to correspond to the respective pixels. The distance of the displacement in the horizontal direction can be gained from the product of the phase difference and the grid period before and after the displacement.

EXPLANATION OF SYMBOLS 1 lamp
2 grid
3 object
4 base
5 digital camera
6 image sensor
7 lens
8 computer
9 output unit
L location of light source
V center of camera lens
R point in reference plane
S point on surface of object
C point at which z axis and grid plane cross
E origin of grid
Q point in grid plane through which light beam passes from light source to point R
G point in grid plane through which light beam passes from light source to point S
B point along z axis through which a line perpendicular to z axis passes from point S on surface of object
P point at which light beam from light source to point R crosses line perpendicular to z axis that passes through point S on surface of object
I point along z axis onto which point R in reference plane is projected perpendicularly

The invention claimed is:

1. A method for measuring a contour of an object arranged on a reference plane by taking an image of the object formed on an imaging surface of a digital camera through a moire topographic optical system wherein a light source of a projector is disposed at the same height as a center of a lens of the digital camera relative to the reference plane, and the imaging surface of the digital camera and a grid plane of the projector having a one-dimensional equally spaced grid pattern of line segments, are arranged in parallel with the reference plane, wherein;

in a coordinate system of the moire topographic optical system, an x-direction is defined as a direction extending orthogonal to each line segment of the grid pattern and a z-direction extending vertically to the reference plane, and a y-direction is defined as extending perpendicular to the x and z directions, and each element of pixel coordinate (i, j) of the image of the grid pattern projected on the imaging surface has a direction defined as extending in parallel to the x-direction and the y-direction, respectively, the method comprising;

projecting the line segments of the grid pattern of the projector on the reference plane to form an image of the grid pattern on the reference plane, setting one period of the image on the reference plane so as to be reflected on the imaging surface as N pixels where N is an integer more than 2 and within the confine of the imaging surface, taking the image of the grid pattern projected on the reference plane by the camera to obtain a projected grid pattern image on the reference plane, and inputting the obtained projected grid pattern image on the reference plane into the computer, using a processor to obtain a phase distribution on the reference plane by a process effected in the processor of, extracting data of serial N pixels from the input projected image on the reference plane, obtaining a frequency spectrum of max power among frequency spectrums by processing the data of the serial N pixels through the discrete Fourier transformation to extract a frequency component of a period including N pixels of the frequency of 1 or −1, determining the phase of the extracted frequency component and storing thus determined phase corresponding to either pixel of the N pixels, shifting thus obtained an array of the N pixels by 1 pixel in the i direction and then carrying out the extracting, obtaining and determining repeatedly until reaching the confine of the imaging surface, and effecting the process including the extracting, obtaining, identifying and shifting in the j-direction to obtain the phase distribution of the projected grid pattern image on the reference plane, the method further comprising;

projecting the line segments of the grid pattern of the projector on the surface of the object to form an image of the grid pattern on the object surface, setting one period of the image on the object surface so as to be reflected on the imaging surface as N pixels where N is an integer more than 2 and within the confine of the imaging surface, taking the image of the grid pattern projected on the object surface by the camera to obtain a projected grid pattern image on the object surface, and inputting the obtained projected grid pattern image on the object surface into the computer, using the processor to obtain a phase distribution on the object surface to be measured by a process performed in the processor by, extracting data of serial N pixels from the input projected image on the object surface, obtaining a frequency spectrum of max power among frequency spectrums by processing the data of the serial N pixels through the discrete Fourier transformation to extract a frequency component of a period including N pixels of the frequency of 1 or −1, determining the phase of the extracted frequency component and storing thus determined phase corresponding to either pixel of the N pixels, shifting thus obtained an array of the N pixels by 1 pixel in the i direction and then carrying out the extracting, obtaining and determining repeatedly before reaching the confine of the imaging surface, and effecting the process including the extracting, obtaining, determining and shifting in the j-direction to obtain the phase distribution of the projected grid pattern image on the object surface, the method further comprising connecting thus obtained phase distribution on the reference plane and that on the object surface wherein:

moire fringes, defined as a difference between the phase on the object surface and that on the reference plane, are obtained on each pixel of the camera, and the contour of the surface of the object is obtained by processing the phase of the obtained moire fringes.

2. The measurement method according to claim 1, further comprising:

finding a phase on a reference plane; and finding the form of the surface of the object through phase unwrapping (phase connection) that is carried out on phases in the reference plane and phases on the surface of the object.

3. The measurement method according to claim 2, wherein the location of the surface of the object is a height, said grid image is projected onto the surface of the object via a grid with light from a light source, and the form of the surface of the object is gained by finding the height of the surface of the object.

4. The measurement method according to claim 3, wherein the height of the center of the camera lens and the height of the light source are the same relative to the reference plane, and images of the surface of the object and the surface of said grid are taken by said camera in such a state as to be parallel to said reference plane.

5. A measurement apparatus comprising a camera and a computer with which the measurement method according to claim 1 can be implemented.

6. A measurement apparatus comprising a camera and a computer with which the measurement method according to claim 2 can be implemented.

7. A measurement apparatus comprising a camera and a computer with which the measurement method according to claim 3 can be implemented.

8. A measurement apparatus comprising a camera and a computer with which the measurement method according to claim 4 can be implemented.

* * * * *